United States Patent [19]

Traylor

[11] 4,221,406
[45] Sep. 9, 1980

[54] ADAPTER FOR COUPLING PASSAGEWAY AND CONDUIT

[76] Inventor: Paul L. Traylor, 16591 Milliken Ave., Irvine, Calif. 92714

[21] Appl. No.: 970,631

[22] Filed: Dec. 18, 1978

[51] Int. Cl.$^2$ ............................................. F16L 39/00
[52] U.S. Cl. .............................. 285/119; 137/625.29; 285/137 R; 285/178
[58] Field of Search ................... 285/178, 137 R, 119; 137/625.29

[56] References Cited

U.S. PATENT DOCUMENTS

| | | | |
|---|---|---|---|
| 388,616 | 8/1888 | Bailey | 285/178 X |
| 2,065,524 | 12/1936 | Groeniger | 285/178 X |
| 3,337,181 | 8/1967 | Wennerstrom | 285/178 X |
| 3,643,692 | 2/1972 | Traylor | 137/625.29 X |
| 4,008,734 | 2/1977 | Shimono et al. | 285/178 X |

FOREIGN PATENT DOCUMENTS

| | | | |
|---|---|---|---|
| 103473 | 1/1963 | Netherlands | 285/178 |
| 10174 | of 1914 | United Kingdom | 285/137 R |
| 1123345 | 8/1968 | United Kingdom | 285/178 |

Primary Examiner—Thomas F. Callaghan
Attorney, Agent, or Firm—Fulwider, Patton, Rieber, Lee & Utecht

[57] ABSTRACT

An adapter for coupling a passageway and a conduit having off-center longitudinal center lines. The adapter includes an elongated internal chamber having an opening for coupling to the passageway. One or more walls of the internal chamber are provided with thickened portions. The circular margins of an opening drilled into the chamber are adapted to circumferentially engage the outer periphery of the extremity of a conduit for sealed association, as by soldering or brazing. Continuation of the drilled opening into the thickened portions of the chamber wall or walls provides arcuate ledges for engaging the end of the conduit to provide structural support. The location of the drilled opening along the length of the chamber establishes the center line distance between the passageway and the conduit. Another drilled opening may be provided for placement of a filter in the chamber.

10 Claims, 11 Drawing Figures

U.S. Patent  Sep. 9, 1980  4,221,406
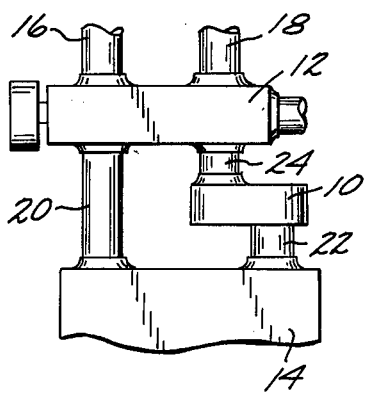
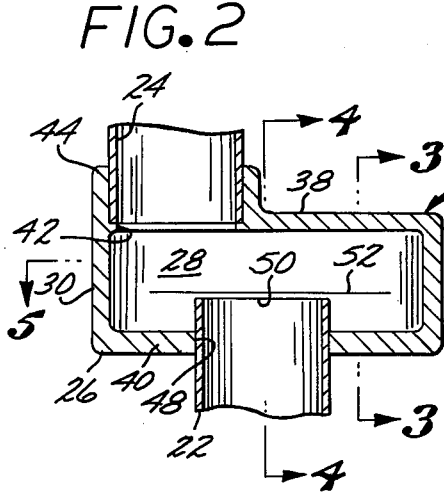
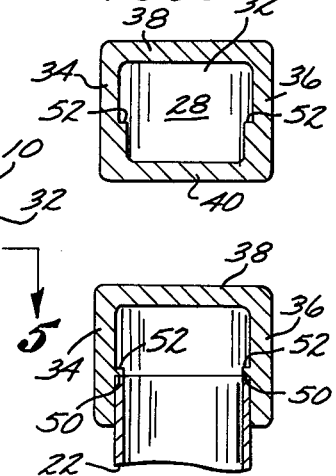
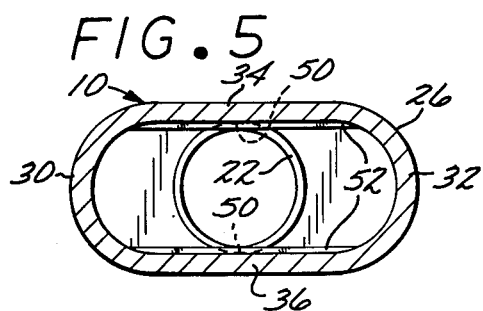
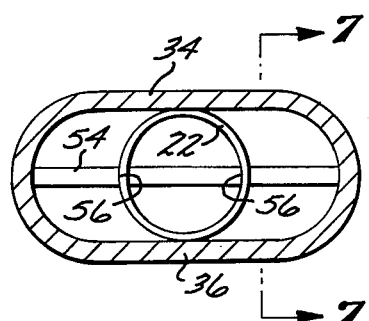
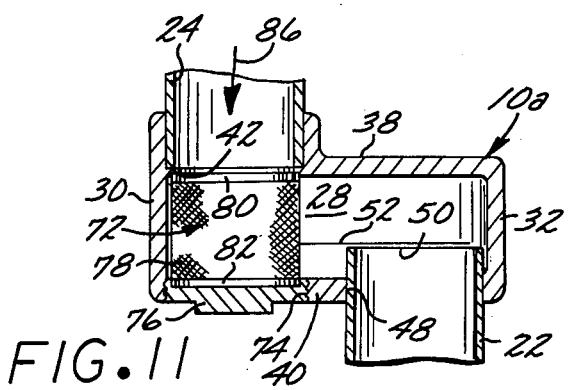
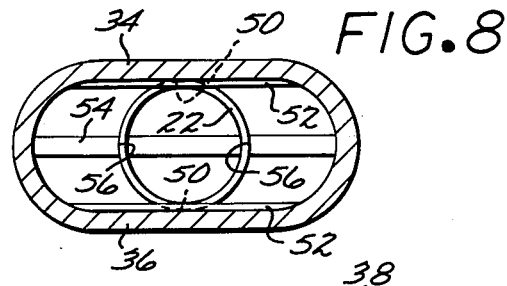
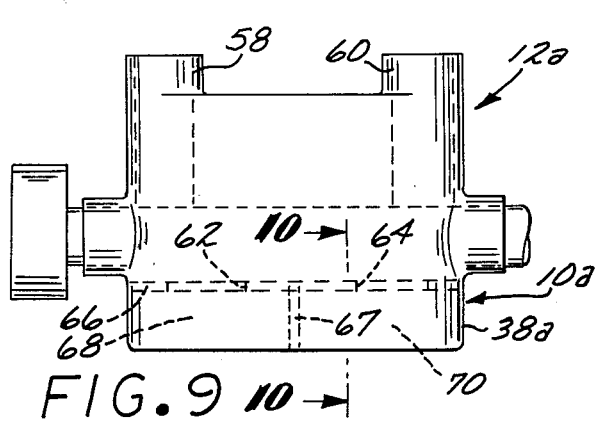
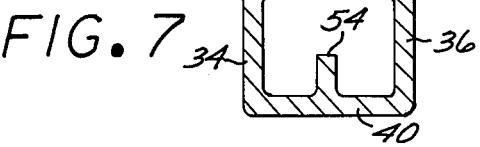
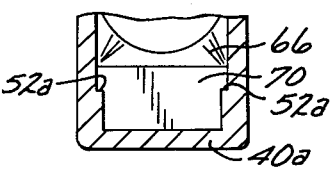

ADAPTER FOR COUPLING PASSAGEWAY AND CONDUIT

BACKGROUND OF THE INVENTION

1. Field of the Invention

The present invention relates to an adapter for coupling a passageway and a conduit having off-center longitudinal center lines.

2. Description of the Prior Art

There are frequent occasions when it is important to quickly and easily provide a fluid coupling between a passageway and a conduit which are longitudinally offset. For example, the usual by-pass valve of a household water softener is characterized by a pair of bosses spaced apart a standard distance for connection to the feed and distribution conduits of the household. However, the centerline distance between the feed and discharge conduits leading to the water softener are not standard, varying according to the manufacturer involved. Consequently, it is difficult to design a by-pass valve adapted to fit more than one style or manufacture of water softener. Attempts have been made to overcome the off-center discrepancy between the various water softeners and by-pass valves by utilizing flexible interconnecting conduits, or by using copper pipe and the like which can be deformed to compensate for the misalignment.

Another proposed solution to the foregoing misalignment problem is use of an adapter connectable to one of the by-pass valve conduits to provide a right angular flow path to the corresponding longitudinally offset softener conduit. However, such an adapter can only be used with one brand of water softener. A different adapter is required for each water softener having a different port spacing.

These expedients have a number of disadvantages and it is desired to provide a system in which a single by-pass valve can be quickly and easily adapted to fit almost any style of water softener, without significant reduction in the volume of fluid flow, and without providing adapter fittings of extraordinary cost or complexity.

SUMMARY OF THE INVENTION

According to the present invention an adapter is provided for quickly and easily coupling a passageway or a first conduit with a second conduit despite discrepancies in the longitudinal alignment of the elements being connected.

In one embodiment of the adapter a casing is provided having a boss which can be externally or internally threaded or provided with an internal cylindrical seat. The boss can thus accept a threaded conduit or a sweat soldered conduit, as required. The passageway of the boss opens into an elongated internal chamber defined by the casing end walls, side walls, and upper and lower walls. If the boss passageway extends through the upper casing wall, the lower casing wall is drilled away at the proper centerline distance to provide an opening whose circular margins are adapted for close association with the periphery of the extremity of the conduit which is to be fluid coupled to the conduit secured to the adapter boss. The margins of the opening can be sweat-soldered or brazed to the conduit to provide a fluid type connection.

It is a feature of the adapter that its casing walls are made relatively thin, thereby reducing the amount of wall material to only that which is necessary to resist fluid pressure within the casing. However, since the thin wall solder joint may not provide adequate structural support for the conduit, the end of the conduit is anchored in position by engagement upon a pair of circular ledges located in the chamber inwardly of the drilled opening in the casing lower wall. These ledges are formed by continuing the drilled opening in the casing wall to cut away a thickened portion or portions integral with one or more of the walls of the casing.

In one embodiment a thickened wall portion is provided in the form of an elongated rib or rail in the lower wall such that longitudinally spaced apart circular ledges are defined in the rail by continuing the drilled opening in the casing wall until it cuts into the rail. Engagement of the end of the conduit with such ledges provides high structural integrity, but at the cost of increasing the wall thickness of the casing wall or walls in only a very limited area. Alternatively, or in addition to a single rail, a pair of elongated rails can be made in the casing side walls. These are also adapted to be cut away during formation of the drilled opening in the casing lower wall, and this provides a pair of transversely spaced arcuate ledges to recline the conduit end.

In yet another embodiment of the adapter it is made integral with a fitting forming part of the by-pass valve housing itself. This allows the by-pass valve to be marketed for connection to a variety of different water softeners having various centerline conduit dimensions, such connection easily being accomplished by simply drilling the conduit opening through the adapter wall at the proper location.

The adapter is also usable to filter liquid passing through the internal chamber. A second drilled opening is provided in the lower wall and a filter element is insertable into the internal chamber through such second opening. A suitable cap is provided to close the opening.

Other objects and features of the invention will become apparent from consideration of the following description taken in connection with the accompanying drawings.

BRIEF DESCRIPTION OF THE DRAWINGS

FIG. 1 is a simplified, partially diagrammatic showing of the present adapter connected between a typical by-pass valve and a water softener;

FIG. 2 is an enlarged longitudinal cross-sectional view of the adapter;

FIG. 3 is a view taken along the line 3—3 of FIG. 2;

FIG. 4 is a view taken along the line 4—4 of FIG. 2;

FIG. 5 is a view taken along the line 5—5 of FIG. 2;

FIG. 6 is a view similar to FIG. 5, but illustrating another embodiment in which a single bottom wall rail is provided instead of the two side rails of the embodiment of FIG. 5;

FIG. 7 is a view taken along the line 7—7 of FIG. 6;

FIG. 8 is a view similar to FIG. 5, but illustrating an embodiment utilizing both a bottom rail and a pair of side rails;

FIG. 9 is a front elevational view of the by-pass valve of FIG. 1 in association with an integral fitting incorporating the present adapter;

FIG. 10 is a view taken along the line 10—10 of FIG. 9; and

FIG. 11 is a view similar to FIG. 2, but illustrating the adapter provided with a filter element.

DESCRIPTION OF THE PREFERRED EMBODIMENTS

As previously indicated, it is frequently important to be able to connect a pair of conduits or passageways characterized by offset or off-center longitudinal centerlines, such as in the connection of a by-pass valve between a household water softener and the household water lines. Such a by-pass valve is described in my U.S. Pat. No. 3,643,692, issued Feb. 22, 1972, and entitled "VALVE," and in my U.S. Patent application Ser. No. 958,347, filed Nov. 6, 1978, and entitled "Valve for Water Treatment Equipment."

Referring now to the drawings, and particularly to FIG. 1, an adapter 10, according to the present invention, is illustrated in association with a water softener 14 and a by-pass valve 12 similar to that described in my pending patent application Ser. No. 958,347. The illustration is partially diagrammatic for the reason that the details of the valve 12 and softener 14 are not a part of the present invention, being well known to those skilled in the art.

The valve 12 includes a pair of ports (not shown) connected to the water system of a household by conduits 16 and 18. Another pair of by-pass valve ports (not shown) are coupled to a pair of conduits 20 and 24, the conduit 20 being longitudinally aligned with a fluid coupled to one of the ports of the water softener 14. The other conduit 24 is connected to the adapter 10, and a conduit 22 extends from the adapter 10 to the second water softener port. As will be seen, the adapter 10 provides a continuous water path between the conduits 24 and 22 despite their longitudinally offset relation.

As best seen in FIGS. 2–5, the adapter 10 comprises, generally, a casing 26 made of any suitable material, such as cast brass, for example. The casing 26 includes an elongated internal chamber 28 defined by a pair of arcuate end walls 30 and 32, a pair of parallel side walls 34 and 36, and parallel upper and lower walls 38 and 40, respectively. The thickness of these walls is approximately the same, being made as thin as possible to save on material costs and, as will be seen, to reduce the time and effort required to drill openings in the lower wall 40.

The upper wall 38 includes a first opening 42 communicating with a boss 44 and providing communication with the chamber 28 at a point adjacent the end wall 30.

The lower wall 40 includes a conduit seat or opening which also communicates with the chamber 28. It is defined by the circular margins of a passage 48 which is drilled through the lower wall 40.

The cross-sectional thickness of the side walls 34 and 36 is made greater from the lower wall 40 up to almost half the depth of the chamber 28, as best seen in FIGS. 3 and 4, to define a pair of parallel rails 52. The drilled passage 48 is extended inwardly sufficiently to cut into the rails 52 and form transversely spaced apart, confronting arcuate stops or ledges 50, which define the lower terminus of the opening in the lower wall 40. The rails 52 constitute a minimum area of thicker wall section for support of the conduit 22, as will be seen.

The neck or boss 44 is provided with a standard counterbore to provide a stop or seat to receive the end of the conduit 16 for sweat soldering or brazing it in position, as will be apparent to those skilled in the art. If desired to suit other applications, the adapter 12 could be manufactured with the boss 44 either externally or internally threaded, depending upon the character of the conduit to be connected to the boss 44. This increases the versatility of the adapter 12.

The flat underface or surface of the lower wall 40 is drilled, usually but not necessarily by the manufacturer, to locate the passage 48 according to the spacing between the valve conduit 24 and the longitudinally offset softener conduit 22. The relatively thin wall section of the wall 40 minimizes the time and effort needed to drill the passage 48, and also minimizes material wastage. As will be apparent, the passage 48 can be drilled anywhere between the end walls 30 and 32, which enables the adapter 12 to be used with a great variety of water softeners having radically different port spacings.

As previously indicated, the adapter 12 is equally effective in connecting longitudinally offset passages and conduits in many applications other than that which is herein described, the by-pass valve-water softener connection being merely exemplary.

Connection of the adapter 12 by the user between the conduits 24 and 22 is quickly and easily accomplished. The conduit 24 is inserted into position and sweat soldered to provide the desired fluid sealing relationship. Next, the conduit 22 is fitted within the drilled passage 48, coming to rest at its end against the arcuate ledges 50. The circular margins of the passage 48 are circumferentially associated with the conduit 22, and in this area the conduit is sweat soldered to the passage margins to provide a sealed relationship. The abutment of the end of the conduit 22 against the ledges 50 provides the mechanical support and structural rigidity necessary to firmly hold the conduit 22 in position despite the relatively thin wall size of the lower wall 40.

Thus, instead of simply increasing the thickness of the lower wall 40 sufficiently to provide the depth of opening necessary to provide structural or mechanical support for the conduit 22, as might occur to those skilled in the art, the thickness of the wall 40 is not increased but instead the unique rails 52 were provided to obtain the desired structural support. This saves material and, even more importantly, it minimizes the overall depth of the adapter 12. That is, if the thickness of the wall 40 had been increased to support the conduit 22, the depth of the chamber 28 and the consequent size of the water passage through the adapter 12 would also be reduced. Increasing the overall depth of the adapter 12 would be required if a water passage of adequate size were to be provided. All of these difficulties are neatly skirted by relying upon the arcuate ledges 50 of the rails 52 to provide mechanical support for the conduit 22, instead of relying solely upon the thickness of the wall 40 for such support.

The inner surfaces of the side walls 34 and 36 are substantially flat to optimize the size of the water flow passage, and the outer surfaces are also substantially flat, in this case to facilitate holding of the adapter 10 with a wrench when threading conduits into position.

Instead of the pair of rails 52, the lower wall 40 of the casing 26 can be integrally provided with a single elongated central rail 54, as best seen in FIGS. 6 and 7, located substantially midway between the side walls 34 and 36. Continuation of the drilled passage 48 inwardly until it cuts into the rail 54 provides a pair of longitudinally spaced apart arcuate ledges 56 to support the end of the conduit 22, in a manner similar to that previously described in connection with the transversely spaced apart ledges 52 of the first embodiment.

Another embodiment of the present adapter is illustrated in FIG. 8. It is identical to the adapter of FIG. 5, except that the elongated central rail 54 of the embodiment of FIG. 6 has been added. The presence of both rails 52 and 54 provides four point mechanical support for the conduit 22 in the form of four equally circumferentially spaced arcuate ledges 50 and 56.

FIGS. 9 and 10 illustrate an arrangement in which an adapter 10a according to the present invention is made an integral part of a by-pass valve 12a. The valve 12a includes bosses 58 and 60 adapted for connection to the conduits 16 and 18, respectively. The conduit 24 utilized in the first embodiment is omitted and instead an internal opening or passageway 64 connects the valve body to the lower portion of the valve 12a. This lower portion integrally includes the adapted 10a, and it functions in a manner analagous to the adapter 10 of the first embodiment, as will be seen. Both the conduits 20 and 22 are connected to the adapter 10a, as will also be seen.

The adapter 10a is an integral part of the body of the valve 12a, having a common wall 66. The passageway 64 and a passageway 62 extend through the wall and provide fluid communication with a pair of internal chambers 68 and 70 defined by an intervening wall 67.

Each of the chambers 68 and 70 is the equivalent of the internal chamber 28 of the first embodiment, each being characterized by a pair of side rails 52a identical in location, operation and function to the rails 52 of the first embodiment.

Passageways are formed for the conduits 20 and 22 by drilling suitable passages through the lower wall 40a and into the chambers 68 and 70, respectively. This forms the circumferential margins (not shown) required for a sealing relation, similar to that provided by the margins 48 of the first embodiment. In addition, the drilled passages are extended to cut into the rails 52a to form arcuate supporting ledges (not shown) for the end of the conduits, as will be apparent.

This arrangement enables the valve 12a to be marketed for association with any of a variety of water softeners having different port or conduit centerline spacings. The vendor of the valve 12a need only obtain the specifications for the particular water softener with which the valve 12a is to be associated, and simply provide the drilled passageways at the proper spacings. Consequently, one standard form of valve 12a is adapted to be marketed for association with many different water softeners.

Referring now to FIG. 11, an adapter 10a is illustrated which is identical to the adapter 10 of FIG. 1 except for certain modifications whereby it is adapted to accept a filter 72. Corresponding numerals are utilized to designate parts of the adapter 10a which are substantially identical to corresponding parts of the adapter 10.

In the adapter 10a the drilled passage 48 is provided adjacent the wall 32. A second drilled passage 74 is provided in the lower wall 40 adjacent the opposite wall 30, and in general alignment with the opening 42.

The passage 74 is drilled sufficiently deep to cut away an annular seat in the wall 38 inwardly of the smaller diameter opening 42, and the opposite or outer end of the passage 74 is internally threaded to receive a threaded filter cap 76.

The filter 72 is characterized by a cylindrical fine mesh screen 78 having annular rings 80 and 82 integral with its opposite ends. The ring 80 is snugly received in the annular seat adjacent the opening 42. The ring 82 is similarly received in a shallow cylindrical cavity formed in the inner face of the filter cap 76. The cap 76 is threaded up against the filter 72 to urge it into its seated position, rotation of the cap 76 being facilitated by a hex head integral with its outer face.

Any impurities in water flowing in the direction of the arrow 86 is entrapped in the interior of the filter 72 as the water passes from the filter interior, through the interstices of the screen 78, and out of the conduit 22.

With the adapter 10a it is a simple matter to introduce a filter into a water flow path and also accommodate a certain amount of misalignment between the conduits forming a part of the flow path. The degree of accommodation can be increased, of course, by providing an adapter 10a with a longer internal chamber 28.

Various modifications and changes may be made with regard to the foregoing detailed description without departing from the spirit of the invention.

I claim:

1. An adapter for coupling a passageway and a conduit having off-center longitudinal centerlines, said adapter comprising a casing having an elongated internal chamber defined by a pair of end walls, a pair of side walls, and upper and lower walls, said upper wall including a first opening into said chamber adjacent one of said end walls and adapted for fluid communication with said passageway, certain of said lower and side walls including integral rail means extending between said end walls and projecting into said chamber, said lower wall including a second opening into said chamber defined by the circular margins of a drilled passage through said lower wall and also by confronting arcuate ledges formed in said rail means by extension of said drilled passage partially into said rail means whereby said circular margins are adapted for circumferential association with said conduit, and said arcuate ledges are adapted to engage opposite circumferential portions of the end of said conduit.

2. An adapter according to claim 1 wherein said integral rail means comprises an elongated rib located in said lower wall substantially midway between said side walls, whereby said arcuate ledges are longitudinally spaced apart.

3. An adapter according to claim 1 wherein said integral rail means comprises thickened sections at the bases of said side walls and extending into said chamber, whereby said arcuate ledges are transversely spaced apart.

4. An adapter according to claim 1 wherein said integral rib means comprises an elongated rib located in said bottom wall between said side walls, and further comprises a pair of thickened sections at the bases of said side walls and extending into said chamber, whereby said arcuate ledges include a pair of longitudinally spaced apart ledges in said elongated rib, and a pair of transversely spaced apart ledges in said thickened portions.

5. An adapter according to claim 1 and including a valve having a wall integral with said upper wall and wherein said passageway is defined by said valve, and said first opening constitutes an extension of said passageway.

6. An adapter for coupling a pair of parallel conduits having off-center longitudinal centerlines, said adapter comprising a casing having an elongated internal chamber defined by a pair of end walls, a pair of side walls having thickened base sections extending into said chamber and constituting a pair of confronting rails, an upper wall including a boss opening into said chamber and adapted for association with one of said conduits, and a lower wall including a conduit seat defined by the circular margins of a drilled passage extending through said lower wall and opening into said chamber, and further defined by confronting arcuate ledges formed in said rails by extension of said drilled passage partially into said rails, whereby said circular margins are adapted for circumferential association with the other of said pair of conduits, and said arcuate ledges are adapted to engage opposite circumferential portions of the end of said other of said pair of conduits.

7. An adapter according to claim 6 and including an elongated rib located in said bottom wall between said side walls, said drilled passage extending partially into said rib to define longitudinally spaced apart ledges adapted to engage opposite circumferential portions of said end of said other of said pair of conduits.

8. An adapter according to claim 6 wherein said lower wall is characterized by a substantially flat outer surface.

9. An adapter for coupling a pair of parallel conduits having off-center longitudinal centerlines, said adapter comprising a casing having an elongated internal chamber defined by a pair of end walls, a left side wall and a right side wall having thickened base sections extending into said chamber and constituting a pair of confronting rails, an upper wall including a conduit opening extending into said chamber adjacent said left side wall and adapted for association with one of said conduits, a lower wall including a conduit seat defined by the circular margins of a drilled passage extending through said lower wall and opening into said chamber adjacent said right wall, said conduit seat being further defined by confronting arcuate ledges formed in said rails by extension of said drilled passage partially into said rails, whereby said circular margins are adapted for circumferential association with the other of said pair of conduits, and said arcuate ledges are adapted to engage opposite circumferential portions of the end of said other of said pair of conduits, said lower wall further including a filter opening extending through said lower wall in general alignment with said conduit opening;

a filter disposed in said chamber adjacent said filter opening and operative to filter liquid passing between said conduit opening and said conduit seat; and a filter cap normally closing said filter opening.

10. An adapter according to claim 6 wherein the inner and outer surfaces of said side walls are substantially flat.

* * * * *